(12) United States Patent
Hall et al.

(10) Patent No.: US 6,945,558 B2
(45) Date of Patent: Sep. 20, 2005

(54) INFLATABLE CURTAIN SUPPORT DEVICE

(75) Inventors: Michael Hall, Ortonville, MI (US);
Lori Pijaszek, Grand Blanc, MI (US);
Jeffrey W Ronne, Shelby Twp., MI (US); Paul Emig, Lake Orion, MI (US); Keri L Setera, Grand Blanc, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/050,511

(22) Filed: Jan. 16, 2002

(65) Prior Publication Data

US 2003/0132624 A1 Jul. 17, 2003

(51) Int. Cl.⁷ .............................................. B60R 21/22
(52) U.S. Cl. ................................................. 280/730.2
(58) Field of Search .......................... 280/730.1, 730.2, 280/743.1, 743.2

(56) References Cited

U.S. PATENT DOCUMENTS

| | | | |
|---|---|---|---|
| 6,022,044 A | * | 2/2000 | Cherry ..................... 280/730.2 |
| 6,102,435 A | | 8/2000 | Wallner et al. |
| 6,103,984 A | * | 8/2000 | Bowers et al. ........... 280/730.2 |
| 6,179,323 B1 | | 1/2001 | Shellabarger |
| 6,199,898 B1 | * | 3/2001 | Masuda et al. .......... 280/730.2 |
| 6,237,943 B1 | | 5/2001 | Brown et al. |
| 6,264,234 B1 | | 7/2001 | Hill et al. |
| 6,336,651 B1 | | 1/2002 | Mramor et al. |
| 6,565,118 B2 | * | 5/2003 | Bakhsh et al. ........... 280/730.2 |

FOREIGN PATENT DOCUMENTS

DE        196 53 796        12/1996

* cited by examiner

Primary Examiner—Faye M. Fleming
(74) Attorney, Agent, or Firm—Sally J. Brown

(57) ABSTRACT

An inflatable curtain having an inflatable portion and a non-inflatable portion is disclosed. First and second stiffening elements are positioned along the upper edge of the inflatable curtain. The inflatable curtain is adapted to be stored within an interior portion of a vehicle prior to inflation. The vehicle has a roof at its highest point, and a housing within the vehicle and close to the roof defines an internal recess that accommodates the inflatable curtain. A side impact of a magnitude greater than a predetermined threshold value is sensed by a sensor mechanism within the vehicle, which then provides an electrical signal to an inflator which is in fluid communication with the inflatable portion of the inflatable curtain. The electrical signal causes the inflator to be actuated in a known manner. The inflator discharges fluid under pressure into the inflatable portion of the inflatable curtain. Shortly after the inflator discharges, the housing opens and the inflatable curtain inflates away from the roof. The first and second stiffening elements provide column support to the inflatable curtain during inflation and reduce the amount of time it takes for the inflatable curtain to become fully inflated.

33 Claims, 4 Drawing Sheets

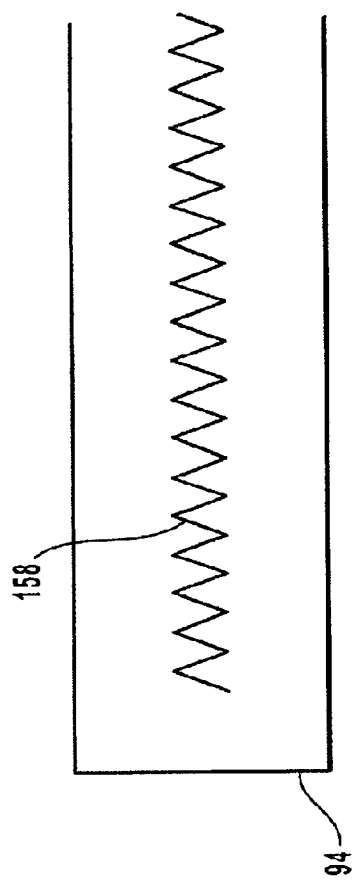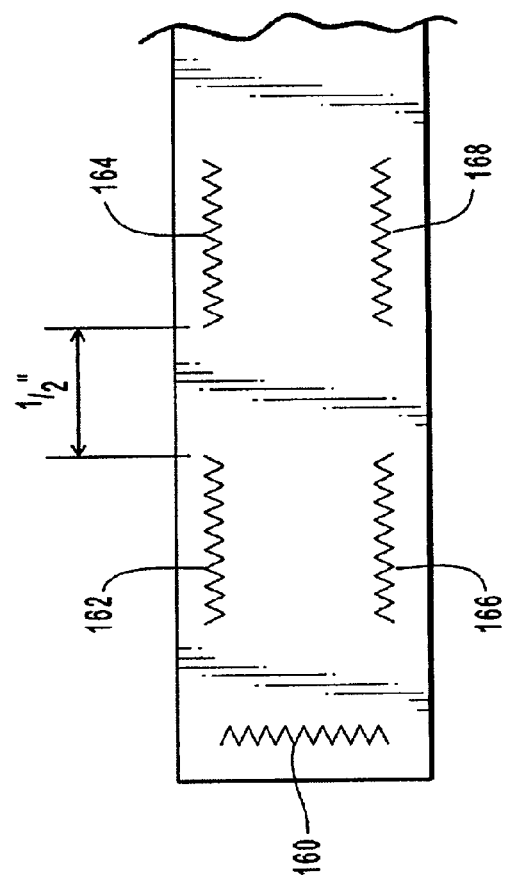

INFLATABLE CURTAIN SUPPORT DEVICE

BACKGROUND OF THE INVENTION

1. Field of the Invention

The present invention relates to an inflatable curtain designed to protect the occupants of a vehicle during a side impact collision. More specifically, the invention relates to a device that reduces the inflation time of the inflatable curtain by providing column support during inflation.

2. Description of Related Art

In low-speed automobile collisions, occupants wearing safety belts are generally prevented from impact with the car's interior objects (i.e., the windshield, instrument panel, or steering wheel). In more severe collisions, however, even belted occupants may impact the car's interior objects because their forward motion is so great that they contact these objects before the belts can bring them to a complete stop.

Conventional air bag systems were developed to supplement safety belts by reducing the chances of contact with the vehicle's interior objects. In addition, to the extent that such contact could not be prevented, conventional air bag systems were designed to distribute the impact more evenly over an occupant's head and torso.

A conventional air bag system typically consists of three parts: the air bag, the sensor, and the inflator. The air bag is typically made of a thin nylon fabric, which is folded into the steering wheel or dashboard. After impact of sufficient severity, sensors in the vehicle detect the sudden deceleration and send an electrical signal to the inflator. A chemical compound (e.g., sodium azide, alcohol, hydrogen, compressed argon gas, or the like) sealed inside the inflator then undergoes a rapid chemical reaction that produces primarily nitrogen gas. The nitrogen gas inflates the air bag. As an occupant contacts the air bag, the nitrogen gas is vented through openings in the sides of the bag, thus absorbing the motion of the occupant's impact.

Vehicle manufacturers and suppliers have developed side impact air bag systems. These air bag systems, which are commonly referred to as "inflatable cushions" or "inflatable curtains," may be mounted within a housing located in the vehicle over the doors, and may inflate during an accident to cover the windows, doors, and lateral surfaces of the vehicle. The inflatable curtain may also be connected to tethers that extend from the ends of the inflatable curtain to anchoring points within the vehicle. These tethers may exert tension on the inflatable curtain to help maintain the position of the inflatable curtain relative to the occupants of the vehicle.

Tethers may provide column support to the inflatable curtain during inflation. In other words, tethers may help maintain the position of the inflatable curtain during inflation, which tends to assist inflation of the inflatable curtain. Tether systems known in the art have a number of disadvantages, however. Packaging the tethers is complicated and expensive. In addition, adding tethers to an inflatable curtain is highly labor intensive, as it may involve a great deal of sewing.

Accordingly, it would be an advancement in the art to provide a support device, besides a tether, that can provide column support to a tetherless inflatable curtain and reduce its inflation time. It would be a further advancement in the art to provide a support device that can provide additional column support to an inflatable curtain having one or more tethers. Additionally, it would be an advancement in the art to provide a support device that can be added to an inflatable curtain with minimal expense. The present invention provides these advancements in a novel and useful way.

SUMMARY OF THE INVENTION

The apparatus of the present invention has been developed in response to the present state of the art, and in particular, in response to the problems and needs in the art that have not yet been fully solved by currently available inflatable curtains. In accordance with the invention embodied and broadly described herein, a novel inflatable curtain support device to provide enhanced protection to the occupants of a vehicle during a side impact collision is disclosed.

In accordance with the present invention, an inflatable curtain is provided. In one embodiment, the inflatable curtain has a length greater than its width, an upper edge, and four corners: an upper front corner, a lower front corner, an upper rear corner, and a lower rear corner. A middle portion of the inflatable curtain is defined by a point between the front edge and the rear edge. Of course, the inflatable curtain may be generally square, oval, or any other desired shape.

The inflatable curtain includes an inflatable portion and a non-inflatable portion which may be formed from separate sheets of material that are arranged in an overlying manner and interconnected. Alternatively, the inflatable portion and non-inflatable portion may be formed from a single sheet of material that is folded over and interconnected.

An inflation inlet may be located on the upper edge of the inflatable curtain. The inflation inlet is in communication with an inflator that contains a stored quantity of pressurized inflation fluid. The inflator includes an output port which disseminates the inflation fluid into the inflatable portion of the inflatable curtain. The inflator also includes lead wires which enable the inflator to be in electrical communication with crash sensors located within the vehicle. The inflator may contain more than one output port, and the inflation inlet and inflator may be positioned toward either the upper rear corner or upper front corner of the inflatable curtain. Also, the inflator may be in communication with a fill tube that contains openings to provide fluid communication between the fill tube and the inflatable curtain.

The inflatable curtain may include a tether positioned near the lower corner of the inflatable curtain. Alternatively, the inflatable curtain may be tetherless, or it may contain a plurality of tethers.

A first stiffening element having a first edge and a second edge may be positioned in the upper rear corner of the inflatable curtain, and a second stiffening element having a first edge and a second edge may be positioned in the upper front corner of the inflatable curtain. In alternate embodiments, any number of stiffening elements may be used in accordance with the present invention, and the stiffening elements may be positioned anywhere along the peripheral region of the inflatable curtain.

The first and second stiffening elements may be plastic stays stitched to the inflatable curtain. However, any type of semi-rigid material may be used for the first and second stiffening elements, including elastomers, aluminum, or the like. In fact, the first and second stiffening elements may be formed as integral portions of the inflatable curtain. This may be accomplished by forming at least a portion of the upper edge of the inflatable curtain out of a piece of semi-rigid fabric, interconnected fabric strips, or the like.

There may be a need to securely fasten the first and second stiffening elements to the inflatable curtain. This may be accomplished by any suitable fastening mechanism, such as stitching or adhesive bonding. For example, a stiffening element may be stitched to the inflatable curtain using a single stitch across the length of the stiffening element. Alternatively, a stiffening element may be stitched to the inflatable curtain with a plurality of stitches that are separated from one another by approximately one-half inch.

The first and second stiffening elements may remain substantially stationary with respect to the length of the inflatable curtain when the inflatable portion is inflated. In particular, neither the first or second edges of the first stiffening element, nor the first or second edges of the second stiffening element, shift to a substantial degree with respect to the length of the inflatable curtain when the inflatable portion is inflated.

The first and second stiffening elements may be generally elongated. Alternatively, the first and second stiffening elements may be any desired shape, such as circular or square. Also, the first and second stiffening elements may be oriented along either the length or width of the inflatable curtain.

The inflatable curtain may be adapted to be stored within an interior portion of a vehicle prior to inflation. The vehicle has a roof at its highest point, and a housing within the vehicle and close to the roof defines an internal recess that may accommodate the inflatable curtain prior to inflation. The housing may have a non-linear, elongated configuration. The vehicle may also include a sensor mechanism, which is adapted to sense a side impact to the vehicle In one embodiment, a side impact of a magnitude greater than a predetermined threshold value is sensed by the sensor mechanism, which then provides an electrical signal to the inflator. The electrical signal causes the inflator to be actuated in a known manner. The inflator discharges fluid under pressure into the inflatable portion of the inflatable curtain. Shortly after the inflator discharges, the housing opens and the inflatable curtain inflates away from the roof. The first and second stiffening elements provide support to the inflatable curtain and reduce the amount of time it takes for the inflatable curtain to become fully inflated.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A is a top plan view of a portion of a stiffening element attached to the inflatable curtain in accordance with the present invention; and FIG. 4B is a top plan view of a portion of a stiffening element attached to the inflatable curtain in accordance with the present invention.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in FIGS. 1 through 4, is not intended to limit the scope of the invention, as claimed, but is merely representative of presently preferred embodiments of the invention.

For example, for purposes of illustration and description, the embodiment described below is used in conjunction with a side impact air bag system. However, the present invention may be used in conjunction with any air bag system that utilizes an inflatable curtain.

Figure 1:
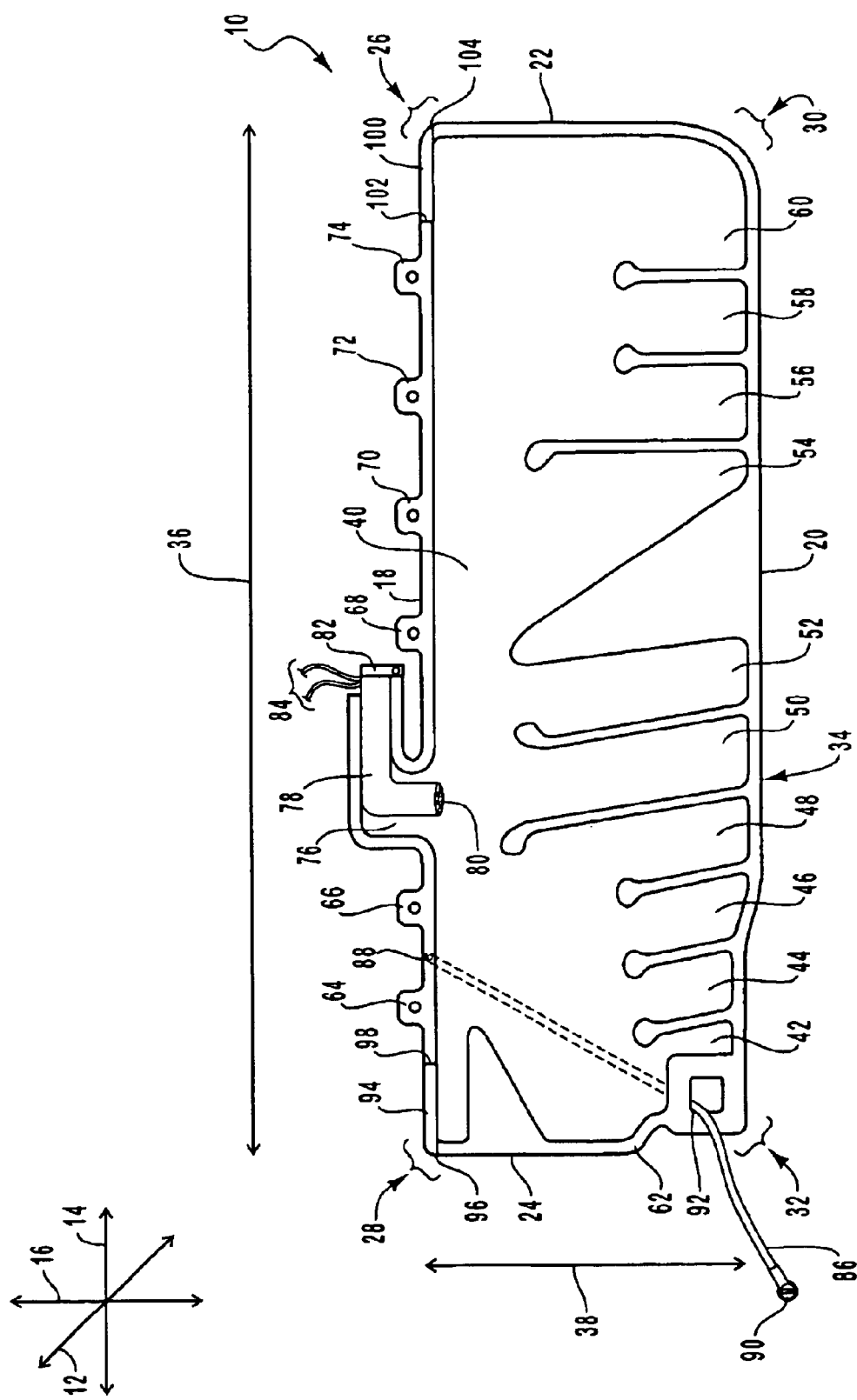
FIG. 1 is a side cross-sectional view of an inflatable curtain in accordance with the present invention.

Referring now to FIG. 1, there is shown a side cross-sectional view of an inflatable curtain 10 having a longitudinal direction 12, a lateral direction 14, and a transverse direction 16. The inflatable curtain 10 shown in FIG. 1 may be constructed of a nylon fabric that is coated with a gas impermeable material such as urethane or silicone. Alternatively, the inflatable curtain may be constructed of elastomers, plastic films, or any other suitable material.

The inflatable curtain 10 has an upper edge 18, a lower edge 20, a front edge 22, and a rear edge 24. The inflatable curtain 10 has a generally rectangular shape with four corners. An upper front corner 26 is defined by the intersection of the front edge 22 and the upper edge 18; an upper rear corner 28 is defined by the intersection of the rear edge and the upper edge 18; a lower front corner 30 is defined by the intersection of the front edge 22 and the lower edge 20; and a lower rear corner 32 is defined by the intersection of the rear edge 24 and the lower edge 20. A lower middle portion 34 is defined by a point between the lower front corner 30 and the lower rear corner 32. The inflatable curtain has a length 36 that is oriented in the lateral direction 14, and a width 38 that is oriented in the transverse direction 16. Of course, the inflatable curtain 10 may take any desired shape. For example, the front edge 22 and rear edge 24 may be formed by extending the upper edge 18 and lower edge 20 until they intersect.

The inflatable curtain 10 has an inflatable portion 40, having a plurality of discrete inflatable cells 42, 44, 46, 48, 50, 52, 54, 56, 58, and 60. The discrete inflatable cells 42, 44, 46, 48, 50, 52, 54, 56, 58, and 60 are distributed along the length 36 of the inflatable curtain 10. In particular, moving left to right in a lateral direction from the lower rear corner 32 of the inflatable curtain 10, six adjacent, discrete inflatable cells 42, 44, 46, 48, 50, and 52 are provided. Moving right to left in a lateral direction from the lower front corner 30 of the inflatable curtain 10, four adjacent, discrete inflatable cells 54, 56, 58, and 60 are provided. Ten discrete inflatable cells 42, 44, 46, 48, 50, 52, 54, 56, 58, and 60 are shown for example purposes only; as many discrete inflatable cells as needed may be provided. The inflatable curtain 10 also has a non-inflatable portion 62.

In FIG. 1, the inflatable portion 40 and non-inflatable portion 62 are formed from separate sheets of material that are arranged in an overlying manner and interconnected. The separate sheets of material may be interconnected in any known fashion, such as sewing or adhesive bonding. Of course, separate sheets of material need not be used. For example, the inflatable portion 40 and non-inflatable portion 62 may be formed from a single sheet of material that is folded over and interconnected.

The inflatable curtain 10 also includes a plurality of connectors 64, 66, 68, 70, 72, and 74. As shown in FIG. 1, the connectors 64, 66, 68, 70, 72, and 74 are small extensions protruding from the upper edge 18 of the inflatable curtain 10. A suitable fastening mechanism, such as a bolt, fits through each connector 64, 66, 68, 70, 72, and to secure the inflatable curtain 10 to a vehicle.

An inflation inlet 76 protrudes from the upper edge 18 of the inflatable curtain 10. The inflation inlet 76 is in communication with an inflator 78. In FIG. 1, the inflator 78 contains a stored quantity of pressurized inflation fluid. However, the inflator 78 could be of any suitable type or construction for supplying a medium for inflating the inflatable portion 40 of the inflatable curtain 10. For example, the inflator 78 may contain a combination of pressurized inflation fluid and ignitable material for heating the inflation fluid. Alternatively, the inflator 78 may be a pyrotechnic inflator that uses the combustion of gas-generating material to generate the inflation fluid.

In FIG. 1, the inflation inlet 76 and inflator 78 are positioned on the upper edge of the inflatable curtain 10, at a point located between the upper front corner 26 and upper rear corner 28. However, the inflation inlet 76 and inflator 78 may be positioned in any desired location. For example, the inflation inlet 76 and inflator 78 may be positioned toward either the upper rear corner 28 or upper front corner 26 of the inflatable curtain 10.

In FIG. 1, the inflator 78 is in direct communication with the inflatable portion 40. In an alternate embodiment, the inflator 78 may be in communication with a fill tube, the fill tube being an elastomeric inner tube with a reinforced outer sheath made of braided or woven fabric, metal, plastic, rubber, nylon, or other suitable material. In such an embodiment, the fill tube may contain openings that provide fluid communication between the fill tube and the inflatable curtain 10. These openings may be non-uniformly distributed because the pressure distribution of the inflation gases diminishes in relation to the distance from the inflator 78. That is, the openings may be biased toward the part of the inflatable curtain 10 farthest from the inflator 78.

Returning to the embodiment depicted in FIG. 1, there is shown an output port located on one end of the inflator 78. The output port 80, which is oriented in the transverse direction 16, disseminates inflation fluid into the inflatable portion 40 of the inflatable curtain 10. Of course, the output port 80 may be disposed toward either the upper rear corner 28 or upper front corner 26 of the inflatable curtain 10, depending on the location of the inflator 78. In addition, the inflator 78 may contain more than one output port 80. For example, the inflator 78 may contain two output ports each oriented in the lateral direction 14, secured to opposing sections of a segmented fill tube via an adapter.

A mounting bracket 82 secures the inflator to a structural component located on a vehicle, such as the vehicle's A-pillar, B-pillar, or C-pillar. The inflator 78 also includes lead wires 84, which enable the inflator 78 to be in electrical communication with the vehicle's crash sensors.

The inflatable curtain 10 also includes a tether 86, having a first end 88 and a second end 90. For purposes of this application, the term "tether" should be interpreted broadly, to encompass any flexible elongated member, such as a strip of rope, webbing, cable, or any other suitable material. Also, although one tether 86 is shown in FIG. 1, the present invention is equally suitable for use with an inflatable curtain 10 that does not contain any tethers 86, or that contains a plurality of tethers 86.

The tether 86 extends through a guide 92 located near the lower rear corner 32 of the inflatable curtain 10. Although the guide 92 may be connected to the inflatable curtain 10 at any desired location, it is preferably located at a point along the non-inflatable portion 62 of the inflatable curtain 10. For example, the guide 92 may be located near the lower edge 20 of the inflatable curtain 10 and spaced away from the rear edge 24. Alternatively, the guide 92 may be located near the lower front corner 30, or in any other suitable location. The guide 92 is preferably a one-way slider device constructed such that the guide 92 slides easily over the tether 86 in a first direction, and is blocked from sliding over the tether 86 in a second direction opposite the first direction.

A first stiffening element 94 having a first edge 96 and a second edge 98 is positioned in the upper rear corner 28 of the inflatable curtain 10. A second stiffening element 100 having a first edge 102 and a second edge 104 is positioned in the upper front corner 26 of the inflatable curtain 10. In FIG. 1, the first stiffening element 94 and second stiffening element 100 are plastic stays stitched to the inflatable curtain 10. However, any type of semi-rigid material may be used for the stiffening elements 94 and 100, including elastomers, aluminum, or the like, or combinations thereof. In fact, the first and second stiffening elements 94 and 100 may be formed as integral portions of the inflatable curtain 10. This may be accomplished by forming at least a portion of the upper edge 18 of the inflatable curtain 10 out of a piece of semi-rigid fabric, interconnected fabric strips, or the like.

It is preferable to position the first and second stiffening elements 94 and 100 along the upper edge 18 of the inflatable curtain 10. However, in accordance with the present invention, the first and second stiffening elements 94 and 100 may be positioned anywhere along the peripheral region of the inflatable curtain 10. When there is a need to securely fasten the first and second stiffening elements 94 and 100 to the inflatable curtain 10, any suitable fastening mechanism may be used. For example, the first and second stiffening elements 94 and 100 may be stitched to the inflatable curtain 10. Alternatively, the first and second stiffening elements 94 and 100 may be securely fastened to the inflatable curtain 10 by adhesive bonding.

The first and second stiffening elements 94 and 100 may remain substantially stationary with respect to the length of the inflatable curtain 10 when the inflatable portion 40 is inflated. In particular, neither the first edge 96 or second edge 98 of the first stiffening element 94, or the first edge 102 or second edge 104 of the second stiffening element 100, shift to a substantial degree with respect to the length 36 of the inflatable curtain 10 when the inflatable portion 40 is inflated.

Although two stiffening elements 94 and 100 are shown in FIG. 1, any number of stiffening elements may be used in accordance with the present invention. In addition, although the first and second stiffening elements 94 and 100 are generally elongated, the first and second stiffening elements 94 and 100 may be any desired shape, such as circular or square. Also, in FIG. 1, the first and second stiffening elements 94 and 100 are oriented along the length 36 of the inflatable curtain. However, the first and second stiffening elements 94 and 100 may be elongated and oriented along the width 38 of the inflatable curtain 10. In such an embodiment, it may be desirable to use more than one stiffening element to provide increased support for the upper edge 18 of the inflatable curtain 10.

Figure 2:
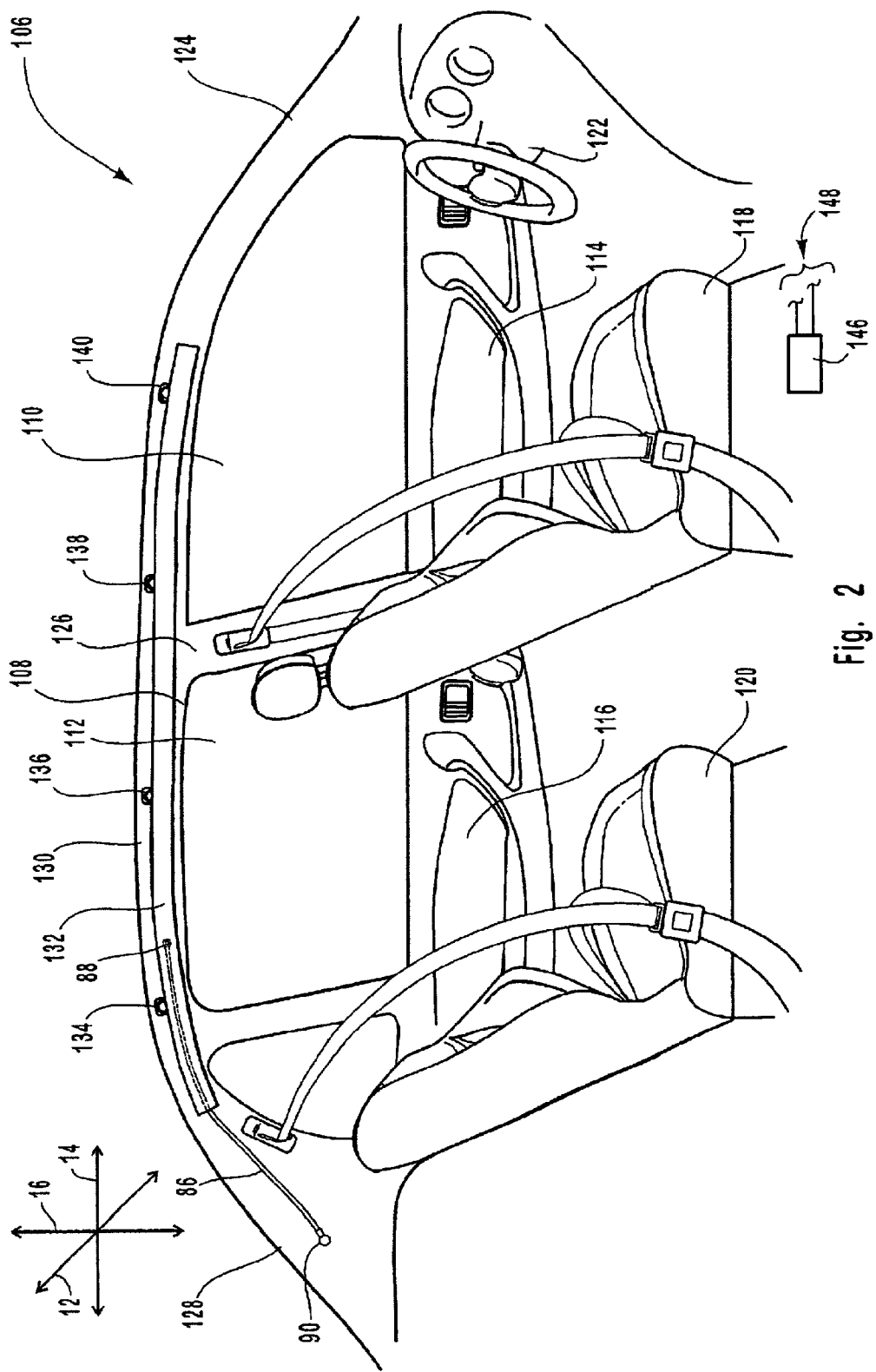
FIG. 2 is a side plan view of the interior of an automobile having an inflatable curtain in accordance with the present invention prior to inflation.

Referring now to FIG. 2, there is shown a side plan view of a vehicle 106 having an inflatable curtain 10 prior to inflation. The vehicle 106 includes a side portion 108, with a front window 110 and a rear window 112 positioned on the side portion 108. A front door 114 is positioned beneath the front window 110, and a rear door 116 is positioned beneath the rear window 112. A front seat 118 is positioned adjacent to the front door 114, and a rear seat 120 is positioned adjacent to the rear door 116. A steeriing wheel 122 is positioned in front of the front seat 118.

An A-pillar 124 is provided toward the front part of the front door 114. A B-pillar 126 is provided between the front window 110 and the rear window 112. A C-pillar 128 is provided toward the rear part of the rear door 116. A roof 130 is positioned over the top of the vehicle 106.

A housing 132 defines an internal recess that accommodates the inflatable curtain 10 in the vehicle 106 prior to inflation. The housing 132 has a non-linear, elongated configuration, originating at a point on the C-pillar 128 and extending along the roof 130. The inflatable curtain 10 may be compacted by accordion folding, rolling, or any other suitable method and stored in the housing prior to inflation. A plurality of fasteners 134, 136, 138, and 140 may be located on the housing 132 and used to secure the housing to the vehicle 106.

When the inflatable curtain 10 is in its stored position prior to inflation, the first end 88 of the tether 86 is secured to the housing 132. The second end 90 of the tether 86 is secured to a point on the C-pillar 128. Either end, however, may be secured to any location that provides a structural linkage to the vehicle 106. Prior to inflation of the inflatable curtain 10, at least a portion of the tether 86 is contained within the housing. In FIG. 2, the portion of the tether 86 contained within the housing 132 is shown by dotted lines. The portion of the tether 86 not contained within the housing 132 is preferably covered by a trim piece.

The vehicle 106 also includes a sensor mechanism 146, which is adapted to sense a side impact to the vehicle. Lead wires 148 are attached to the sensor mechanism 146. The lead wires 148 provide electrical communication between the sensor mechanism 146 and the inflator 78.

Figure 3:
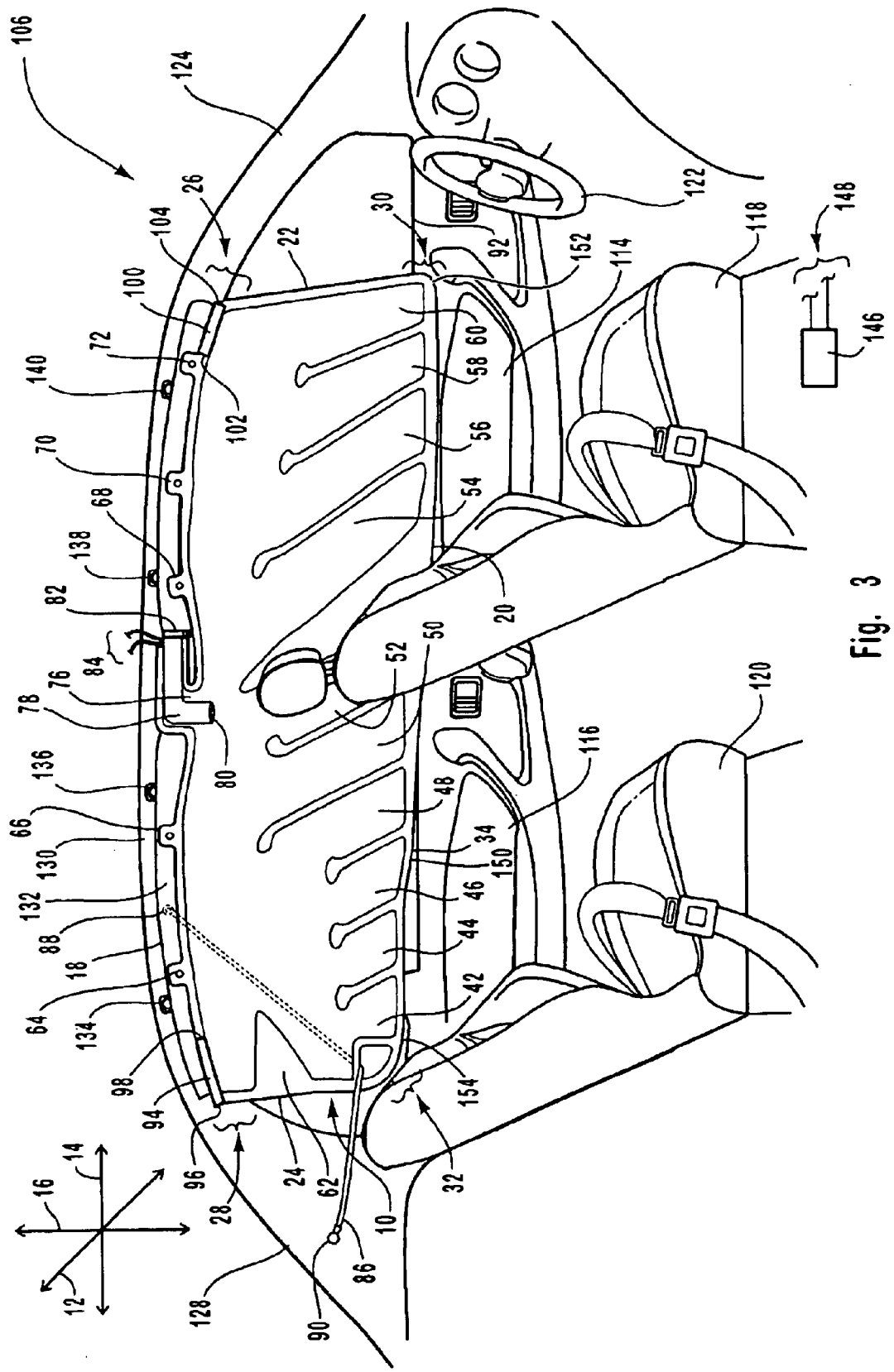
FIG. 3 is a side plan view of the interior of an automobile having an inflatable curtain in accordance with the present invention after inflation.

Referring now to FIG. 3, there is shown a side plan view of the vehicle 106 having an inflatable curtain 10 after inflation. The housing 132 is in an open position, so that the inflatable curtain 10 is no longer contained within the housing 132. The inflator 78 has discharged, and the inflatable curtain 10 is shown in its inflated position, located between the front seat 118 and rear seat 120 and the side portion 108 of the vehicle 106.

A first point 150 is located close to the front seat 118. A second point 152 is located between the front seat 118 and the steering wheel 122. A third point 154 is located in front of the rear seat 122. The lower middle portion 34 of the inflatable curtain 10 is disposed near the first point 150. The lower front corner 30 of the inflatable curtain 10 is disposed near the second point 152. The lower rear corner 32 of the inflatable curtain 10 is disposed near the third point 154. The discrete inflatable cells 42, 44, 46, 48, 50, 52, 54, 56, 58, and 60 are primarily disposed in front of the front seat 118 and rear seat 120, in position to protect the occupants of the vehicle 106. The tether 86 is substantially taut, to prevent the inflatable curtain 10 from shifting to a measurable degree with respect to the occupants of the vehicle 106.

Referring now to FIG. 4A, there is shown a top plan view of a portion of the first stiffening element 94 attached to the inflatable curtain 10. A single stitch 158 may be used to securely fasten the first stiffening element 94 to the inflatable curtain 10. Alternatively, a plurality of stitches 160, 162, 164, 166, and 168 may be used, as shown in FIG. 4B. The plurality of stitches 160, 162, 164, 166, and 168 may be separated by a suitable distance, such ½ inch. The first stiffening element 94 may also be securely fastened by bonding, or it may be formed as an integral portion of the inflatable curtain 10.

Referring generally to FIGS. 1–4, the operation of the present invention will be described. In response to the sensing of a side impact of a magnitude greater than a predetermined threshold value, the sensor mechanism 146 provides an electrical signal over the lead wires 148 to the inflator 78. The electrical signal causes the inflator 78 to be actuated in a known manner. The inflator 78 discharges fluid under pressure into the inflatable portion 40 of the inflatable curtain 10.

Shortly after the inflator 78 discharges, the housing 132 opens and the inflatable curtain 10 inflates away from the stored position in a transverse direction 16 away from the roof 130. The inflatable curtain 10 does not inflate evenly, however. In particular, the lower middle portion 34 of the inflatable curtain 10 reaches the first point 150 and the lower rear corner 32 reaches the third point 154 while the lower front corner 30 remains substantially within the housing 132. The first and second stiffening elements 94 and 100 provide support to the inflatable curtain 10 and reduce the amount of time it takes for the lower front corner 30 and lower rear corner 32 to reach the second and third points 152 and 154.

Of course, the invention is not limited to two stiffening elements, and as many stiffening elements as desired may be used. In addition, the stiffening elements 94 and 100 may be situated anywhere along the peripheral region of the inflatable curtain 10. However, to provide the greatest column support and achieve the greatest reduction in the inflation time of the inflatable curtain, the upper edge 18 of the inflatable curtain 10 should preferably be supported as much as possible.

From the above discussion, it will be appreciated that many of the problems associated with known inflatable curtains, including tetherless inflatable curtains, are addressed by the teachings of the present invention. The present invention provides one or more stiffening elements that can provide column support to a tetherless inflatable curtain and reduce its inflation time. However, a stiffening element in accordance with the present invention is not limited to use with tetherless inflatable curtains, and can provide additional column support to an inflatable curtain having one or more tethers. Additionally, a stiffening element in accordance with the present invention may be added to an inflatable curtain with minimal expense.

Of course, the present invention may be embodied in other specific forms without departing from its essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An inflatable curtain for protecting the occupants of an automobile, the inflatable curtain comprising:
   a peripheral region;
   an inflatable portion having a length; and
   a first stiffening element positioned along portion of the peripheral region, wherein the first stiffening element is a stay, wherein the first stiffening element has an elongated shape oriented substantially parallel to the inflatable portion to reduce flexure of the portion of the peripheral region during deployment, thereby increasing uniformity of inflation time of the inflatable portion along the length.

2. The inflatable curtain of claim 1, wherein the inflatable portion further comprises an inflation inlet for communication with an inflator.

3. The inflatable curtain of claim 1, wherein the stiffening element is substantially planar.

4. The inflatable curtain of claim 1, wherein the first stiffening element remains substantially stationary with respect to the length of the inflatable curtain when the inflatable portion is inflated.

5. The inflatable curtain of claim 1, further comprising a second stiffening element positioned along at least a portion of the peripheral region.

6. The inflatable curtain of claim 1, wherein the first stiffening element has a length greater than its width, the inflatable curtain has a length greater than its width, and the length of the first stiffening element is oriented substantially parallel to the length of the inflatable curtain.

7. The inflatable curtain of claim 1, wherein the peripheral region comprises an upper part, and the first stiffening element is positioned along the upper part.

8. The inflatable curtain of claim 1, wherein the stiffening element is formed as an integral portion of the inflatable curtain.

9. The inflatable curtain of claim 1, wherein the stiffening element is securely fastened to the inflatable curtain.

10. The inflatable curtain of claim 9, wherein the stiffening element is a plastic stay.

11. The inflatable curtain of claim 9, wherein the first stiffening element is stitched to the peripheral region.

12. The inflatable curtain of claim 1, wherein the inflatable curtain is tetherless.

13. The inflatable curtain of claim 1, further comprising a tether.

14. The inflatable curtain, of claim 1, wherein the inflatable curtain has a lower middle portion, a lower rear corner, and a lower front corner, wherein the first stiffening element is positioned to expedite inflation of at least one of the lower rear and lower front corners with respect to inflation of the lower middle portion.

15. The inflatable curtain of claim 14, wherein the first stiffening element is attached directly to one of an upper front corner and an upper rear corner of the inflatable curtain.

16. An inflatable curtain for protecting the occupants of an automobile, the inflatable curtain comprising:
   a peripheral region;
   an inflatable portion; and
   a first substantially planar stiffening element positioned along a portion of the peripheral region, independent of attachment of the inflatable curtain to the automobile, wherein the first stiffening element is a stay, wherein the first stiffening element has an elongated shape oriented substantially parallel to the inflatable portion to make the portion of the peripheral region more resistant to flexure than the inflatable portion and to enhance inflation of the inflatable portion.

17. The inflatable curtain of claim 16, further comprising a second stiffening element positioned along at least a portion of the peripheral region.

18. The inflatable curtain of claim 16, wherein the first stiffening element has a length greater than its width, the inflatable curtain has a length greater than its width, and the length of the first stiffening element is oriented substantially parallel to the length of the inflatable curtain.

19. The inflatable curtain of claim 16, wherein the peripheral region comprises an upper part, and the first stiffening element is positioned along the upper part.

20. The inflatable curtain of claim 16, wherein the stiffening element is formed as an integral portion of the inflatable curtain.

21. The inflatable curtain of claim 16, wherein the stiffening element is securely fastened to the inflatable curtain.

22. The inflatable curtain of claim 16, wherein the stiffening element is a plastic stay.

23. The inflatable curtain of claim 16, wherein the stiffening element is stitched to the peripheral region.

24. The inflatable curtain of claim 16, wherein the inflatable curtain is tetherless.

25. The inflatable curtain of claim 16, further comprising a tether.

26. An inflatable curtain for protecting the occupants of an automobile, the inflatable curtain comprising:
   a peripheral region having an upper part;
   an inflatable portion comprising an inflation inlet for communication with an inflator; and
   a first stiffening element attached exclusively and directly to at least a portion of the upper part via stitching to enhance inflation of the inflatable portion, wherein the first stiffening element is a stay.

27. The inflatable curtain of claim 26, further comprising a second stiffening element positioned along at least a portion of the peripheral region.

28. The inflatable curtain of claim 26, wherein the stiffening element is formed as an integral portion of the inflatable curtain.

29. The inflatable curtain of claim 26, wherein the stiffening element remains substantially stationary with respect to the length of the inflatable curtain when the inflatable portion is inflated.

30. The inflatable curtain of claim 29, wherein the stiffening element is a plastic stay.

31. The inflatable curtain of claim 29, wherein the first stiffening element has a length greater than its width, wherein the length of the first stiffening element is oriented substantially parallel to the length of the inflatable curtain.

32. The inflatable curtain of claim 26, wherein the inflatable curtain is tetherless.

33. The inflatable curtain of claim 26, further comprising a tether.

* * * * *

UNITED STATES PATENT AND TRADEMARK OFFICE
CERTIFICATE OF CORRECTION

PATENT NO. : 6,945,558 B2 Page 1 of 1
APPLICATION NO. : 10/050511
DATED : September 20, 2005
INVENTOR(S) : Hall et al.

It is certified that error appears in the above-identified patent and that said Letters Patent is hereby corrected as shown below:

Title Page:

At column 1, please add the following after "(73) Assignee: Autoliv ASP, Inc., Ogden UT (US)":

General Motors, Detroit MI (US)

Signed and Sealed this

Twenty-seventh Day of May, 2008

JON W. DUDAS
*Director of the United States Patent and Trademark Office*